United States Patent [19]
Young

[11] 3,820,743
[45] June 28, 1974

[54] VTOL AIR AND SPACE CRAFT

[76] Inventor: Frank G. Young, 26 Elm St., Saugerties, N.Y. 12477

[22] Filed: Mar. 17, 1972

[21] Appl. No.: 235,618

[52] U.S. Cl. .................................. 244/4 R, 244/56
[51] Int. Cl. ............................................. B64c 1/00
[58] Field of Search ............ 244/1 SS, 1 SB, 2, 4, 8, 244/12 R, 12 A, 12 B, 23 R, 23 A, 23 B, 34 R, 35, 36, 39, 40 R, 41, 42 R, 45 R, 46, 54, 55, 56

[56] References Cited
UNITED STATES PATENTS

| | | | |
|---|---|---|---|
| 2,701,021 | 2/1955 | Sargent | 244/54 |
| 2,978,209 | 4/1961 | Kerry | 244/54 |
| 3,120,361 | 2/1964 | Riebe et al | 244/36 |
| 3,208,695 | 9/1965 | Aruta | 244/56 |

Primary Examiner—Duane A. Reger
Assistant Examiner—Jesus D. Sotelo
Attorney, Agent, or Firm—Brady, O'Boyle & Gates

[57] ABSTRACT

A vertical take-off and landing air and space craft which is basically a wing having a cabin mounted therein or thereon. An engine, engine mount, ailerons, elevators and rudders are pivotally mounted to the wing portion and are movable to a position relative thereto to cause a spinning motion to the wing, similar to that of a falling maple seed, to thereby impart a vertical ascent or descent to the craft; the engine, engine mount, ailerons, elevators and rudders being movable to another position to thereby impart horizontal, non-spinning flight to the craft.

4 Claims, 12 Drawing Figures

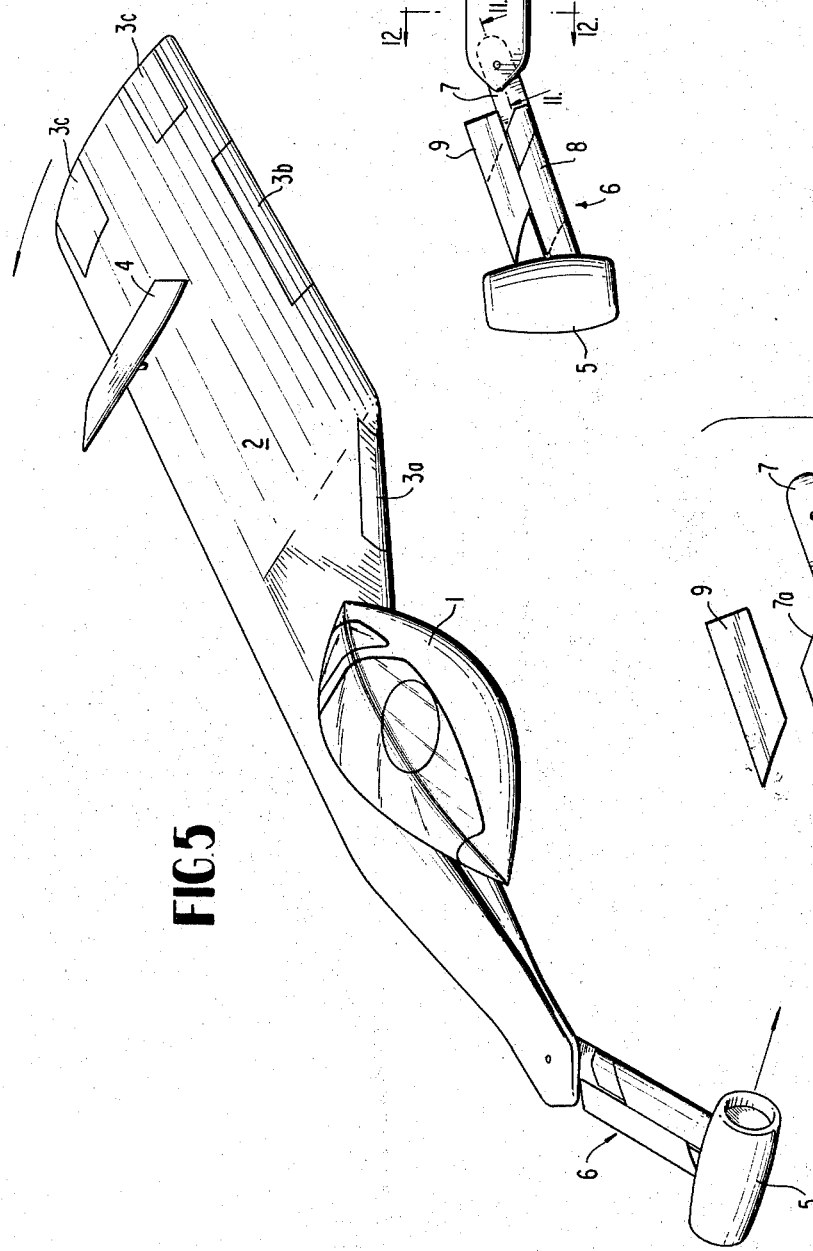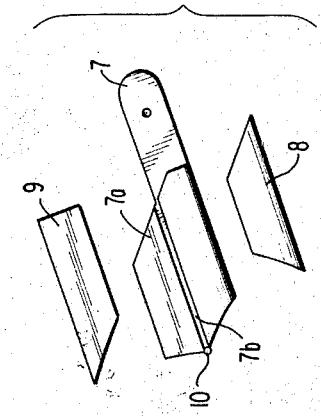

VTOL AIR AND SPACE CRAFT

BACKGROUND OF THE INVENTION

In view of the critical lack of runway capacity to meet the needs of the growing aircraft industry throughout the world, various types of vertical take-off and landing aircraft have been proposed. Some of the prior art craft are lifted nose first from a tail sitting position while others have been proposed having saucer-like designs. Many of the craft employ lifting rotors while others employ counter rotating propellers, ducted fans and various jets propulsion systems which are convertible from vertical to normal horizontal flight.

In the continuous research and development of vertical take-off and landing aircraft, the aircraft of the present invention has been devised the mode of operation of which departs drastically from the heretofore VTOL aircraft while being practical, safe and relatively economical. The VTOL craft of the present invention comprises, essentially, a wing portion having a cabin mounted therein or thereon. An engine, engine mount, rudders and other controls are pivotally mounted on the wing portion and are movable to a position relative thereto to cause a spinning motion to the wing, similar to that of a falling maple seed, to thereby impart a vertical ascent or descent to the craft; the engine, engine mount, rudders and other controls being movable to another position to thereby impart horizontal, non-spinning flight to the craft.

Various detailed features and advantages of the invention will become apparent during the course of the following description.

BRIEF DESCRIPTION OF THE DRAWINGS

FIG. 5 is a perspective view of the VTOL craft of the present invention during vertical flight;

FIG. 6 is an exploded top plan view of the aerodynamic control linkage and associated slidable covers employed for pivotally connecting the engine to the wing portion;

FIGS. 7, 8 and 9 are fragmentary top plan views of the aircraft engine and associated aerodynamic control linkage during selected manipulations of the linkage and engine;

Figure 1:
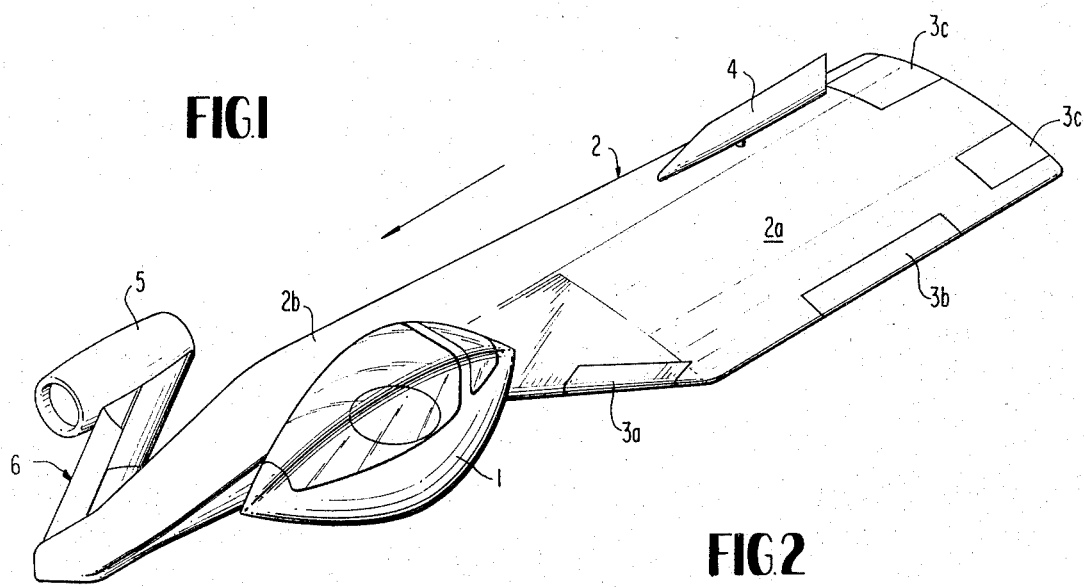
FIG. 1 is a perspective view of the VTOL craft of the present invention during horizontal flight.
Figure 2:
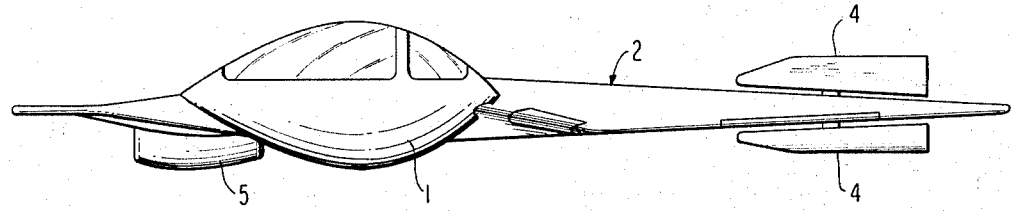
FIG. 2 is a side elevational view of the aircraft shown in FIG. 1.
Figure 4:
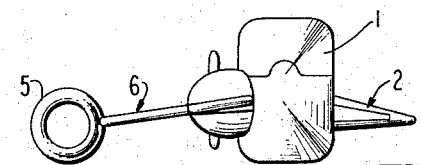
FIG. 4 is a front elevational view of the aircraft.
Figure 3:
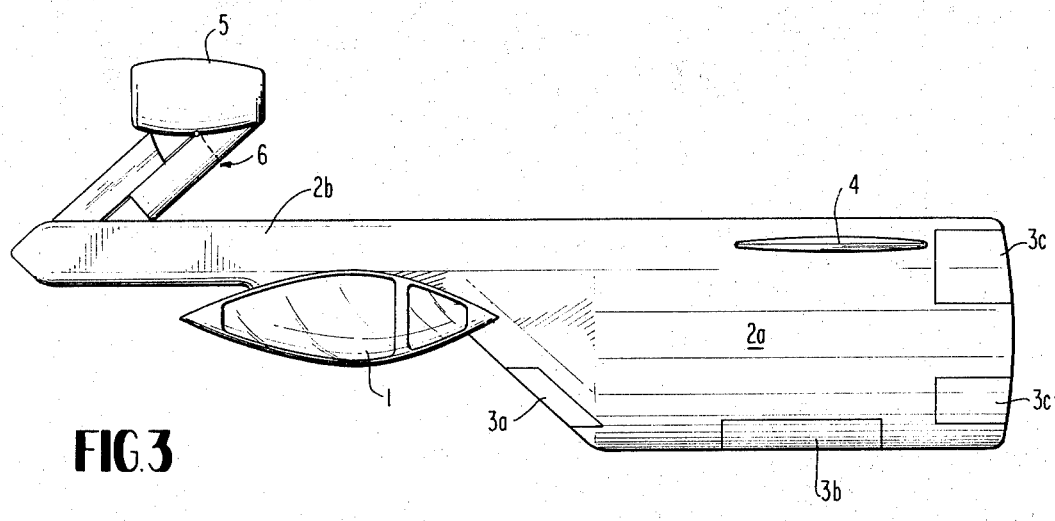
FIG. 3 is a top plan view of the aircraft.

Referring to the drawings and more particularly to FIGS. 1 to 4, the aircraft of the present invention comprises a cabin 1 mounted on a wing portion 2 having multi-purpose ailerons 3a, 3b; elevators 3c; and rudders 4 pivotably mounted thereon. While the cabin shown is mounted on the wing, it can be also mounted in the wing forming an integral part thereof. A source of power such as a jet engine or rocket engine 5 is pivotably mounted to the wing portion through suitable linkage 6, to be described more fully hereinafter, the aircraft also being provided with suitable landing gear (not shown). The orientation of the engine with respect to the wing as shown in FIG. 1 will effect the horizontal flight of the aircraft in the direction of the arrow.

When the engine 5, engine mount 6 and rudders 4 are oriented with respect to the wing portion 2 as shown in FIG. 5, a maneuverable spinning motion is imparted to the aircraft to effect a vertical ascent or descent to the craft similar to that of a falling maple seed, the cabin 1 being positioned near the center of gravity of the aircraft which will also be near the center of the spin axis.

The wing employed in the aircraft of the present invention is similar to a wing or airfoil from one side of a conventional monoplane modified as a basic structure, the outer end portion 2a of the wing being relatively lighter and wider than the relatively heavy, narrow inner portion 2b. During the ascent or descent of the aircraft, the wing tip travels in a circular or helical path and the inner portion 2b of the wing forms a spin center; thus, the air flow over the lightweight end 2a of the wing is in the general direction of that for a standard aircraft wing. During the non-spinning or horizontal flight of the aircraft, the inner portion 2b of the wing becomes the front of the aircraft; therefore, the air flow is at right angles to what it was during spinning.

In the operation of the aircraft for vertical flight, the various components are oriented in the position shown in FIG. 5 and aileron 3b is manipulated to control the vertical ascent of the aircraft. After the aircraft reaches the desired altitude, the components are shifted to the position shown in FIG. 1 to cause the horizontal flight of the aircraft wherein section 2b and the elevator 3c form the leading and trailing edges, respectively, of the aircraft.

When it is desired to land the aircraft, the components are once again shifted to the position shown in FIG. 5 to thereby impart a spinning or spiraling motion to the aircraft similar to that of a falling maple seed.

Figure 8:
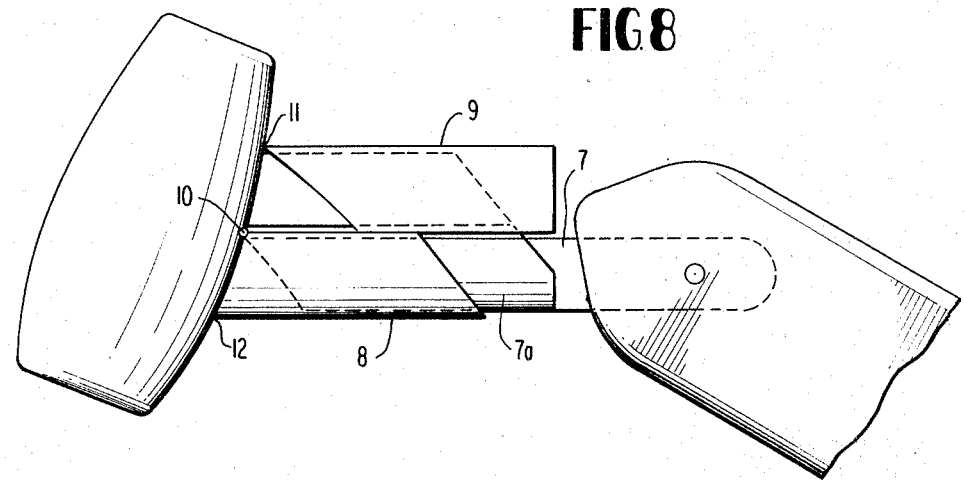
Figure 9:
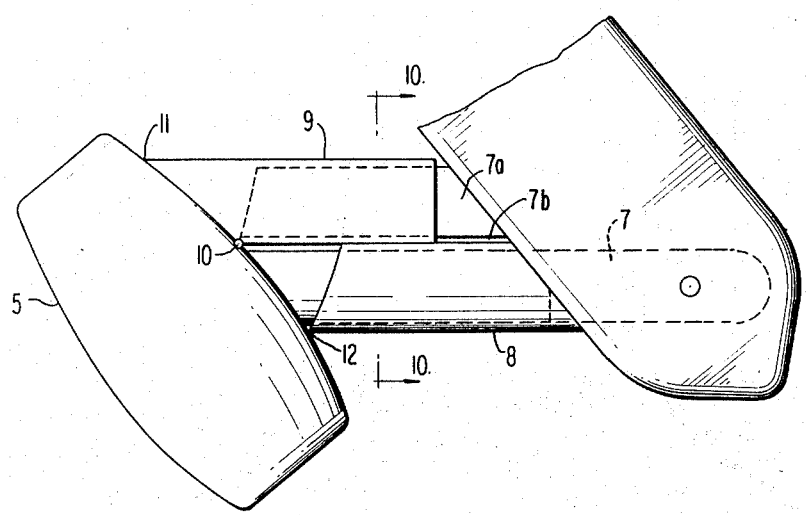
Figure 10:
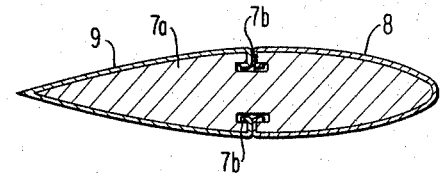
FIG. 10 is a view taken along line 10—10 of FIG. 9.
Figure 11:
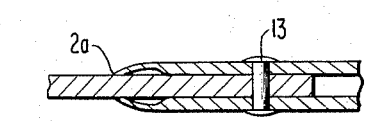
FIGS. 11 and 12 are views taken along lines 11—11 and 12—12, respectively, in FIG. 7.
Figure 12:
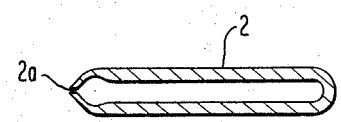

The details of the linkage 6 employed for connecting the engine 5 to the wing are shown in FIGS. 6 and 10 wherein it will be seen that an arm 7 is provided with an aerodynamically contoured portion 7a having slots 7b formed on each side thereof for slidably receiving similarly contoured cover members 8 and 9. The aircraft engine is pivotally connected to the contoured portion of the arm as at 10, the cover members being connected to the engine as at 11 and 12 as shown in FIGS. 8 and 9. By this construction and arrangement, when the engine is pivoted as shown in FIGS. 8 and 9, the contoured covers 8 and 9 are caused to slide longitudinally of the contoured portion of the arm whereby the linkage is aerodynamically supported during the various modes of flight of the aircraft. The inner end portion of the arm 7 is inserted within a slotted portion 2a (FIG. 12) formed on the tip of the wing, the arm being pivotally connected to the wing tip as at 13.

It will be appreciated by those skilled in the art that suitable controls will be provided in the cabin for manipulating the various rudders, elevators, flaps, ailerons, engine and linkage. To prevent dizziness during the spinning flight of the aircraft, the control cabin would be constructed and arranged so that the pilot's head would be located in a position in the craft where the spinning produces artificial gravity downward. Other arrangements can be employed such as gyroscopically mounting the cabin on the wing or a similarly supported periscope which would give the pilot a non-rotating view of the surrounding area. In large craft, the spinning rate will be so slow that the necessity of compensating for dizziness will be precluded.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A vertical take-off and landing air and space craft comprising, an airfoil having a relatively wide and lightweight portion at one end thereof, and a relatively narrow and heavy portion at the opposite end thereof, a control cabin mounted on said airfoil, engine means, and linkage means operatively connecting said engine means to said opposite end of said airfoil, said engine means being movable to a first position relative to the airfoil to cause a spinning or auto-rotation motion to the airfoil, to thereby impart a vertical ascent or descent to the craft similar to that of a falling maple seed, said engine means being movable to a second position relative to the airfoil to thereby impart horizontal flight to the craft.

2. A vertical take-off and landing air and space craft according to claim 1 wherein the control cabin is mounted on the airfoil in proximity to said opposite end.

3. A vertical take-off and landing air and space craft comprising an airfoil having a relatively wide and lightweight portion at one end thereof, and a relatively narrow and heavy portion at the opposite end thereof, a control cabin mounted on said airfoil, engine means, and linkage means operatively connecting said engine means to said opposite end of said airfoil, said engine means being movable to a first position relative to the airfoil to cause a spinning motion to the airfoil, to thereby impart a vertical ascent or descent to the craft similar to that of a falling maple seed, said engine means being movable to a second position relative to the airfoil to thereby impart horizontal flight to the craft, said linkage means comprising an arm contoured as an airfoil, one end of said arm being pivotally connected to said opposite end of said airfoil, said engine means being pivotally connected to the opposite end of said arm.

4. A vertical take-off and landing air and space craft according to claim 3 wherein airfoil contoured cover means is slidably mounted on said arm, said cover means being operatively connected to said engine means, whereby pivotal movement of the engine means relative to the arm causes the cover means to slide on said arm.

* * * * *